April 23, 1929.  R. H. BRESSON ET AL  1,710,340

ELECTRIC MARKING DEVICE

Filed Dec. 30, 1926

Inventors
Roy H. Bresson,
Ernest V. Knoblock,

By

Attorneys

Patented Apr. 23, 1929.

1,710,340

UNITED STATES PATENT OFFICE.

ROY H. BRESSON AND ERNEST V. KNOBLOCK, OF DETROIT, MICHIGAN.

ELECTRIC MARKING DEVICE.

Application filed December 30, 1926. Serial No. 158,014.

This invention relates to an electric branding iron and our invention aims to provide a device that may be advantageously used for branding, marking and otherwise identifying tires, shipping boxes, packages and various kinds of merchandise. It may be used for branding live stock, but has been especially designed for addressing shipping boxes, crates and the like so that there is practically a permanent address that cannot become accidentally displaced during shipment or conveniently changed with fraudulent intent. As a tire marker our device will permit the owner of the tire placing his name and address thereon and thus minimize the nefarious practice of stealing tires or at least provide tire identification by which a stolen tire may be recovered.

Our invention further aims to provide an electric marking device with interchangeable type that may be easily and quickly set to provide desired indicia. The device is constructed so that the parts may be easily and quickly assembled, safely handled and conveniently used.

The construction entering into the marking device will be hereinafter specifically described and then claimed, and reference will now be had to the drawing, wherein Figure 1 is a longitudinal sectional view of the device;

The device comprises a substantially cylindrical casing 1 that may be made of metal or any suitable material. The top of the casing has a central interiorly screw threaded boss 2 for the stem 3 of a handle 4 by which the device may be conveniently manipulated.

Figure 1:
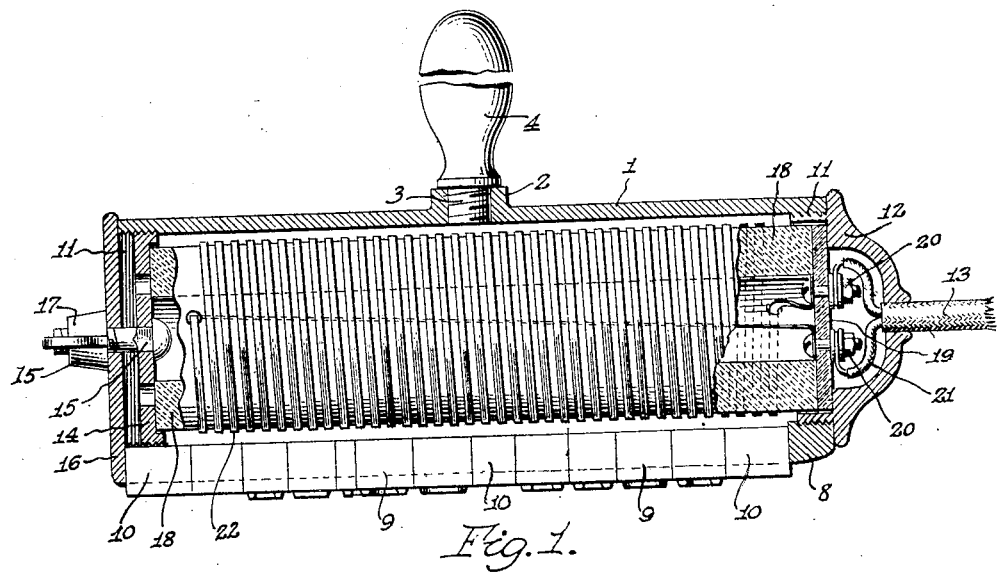
Figure 2:
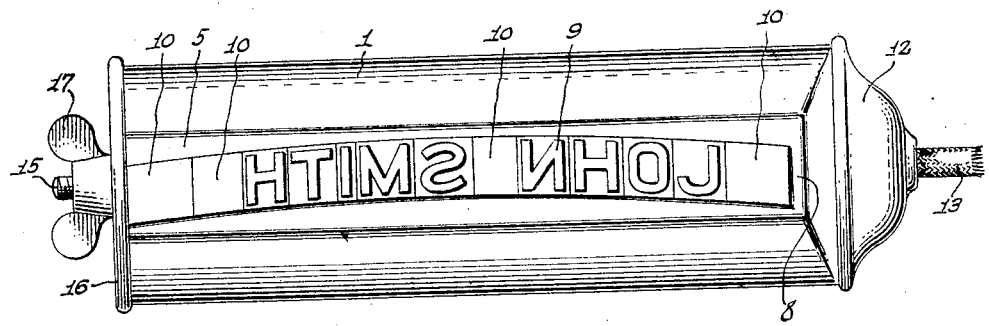
Fig. 2 is a bottom plan of the same.
Figure 3:
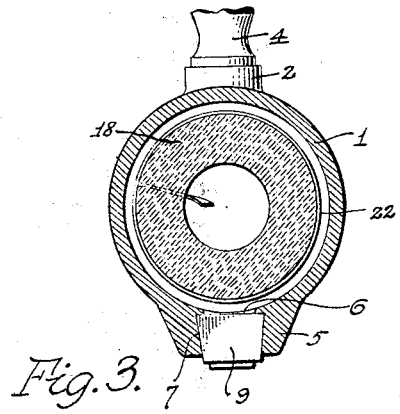
Fig. 3 is a cross sectional view of the device.

The bottom of the casing has a longitudinal enlargement 5 provided with a curved longitudinal slot 6 and the greater part of this slot is dove-tailed to form a tapering seat 7 or walls which taper inwardly towards the bottom of the enlargement 5. One end of the slot 6 is closed by an end wall 8 of the enlargement 5 and the opposite end of the slot is open so that tapered type 9 may be placed in the slot 6 on the seat 7 with the taper of the type and seat preventing radial movement of the type. The type are preferably made of metal and any suitable font may be used which includes spacers or blanks 10. The selected type and spacers are placed in the open end of the slot 6 in their order, and shifted lengthwise of the slot until filled, so that the type may be held in place by an endwise clamping action that prevents longitudinal displacement of the type. In some instances the slot and type may be arcuated, as shown in Fig. 2 or any other configuration imparted to the same while in other instances a single marking element may be mounted in the enlargement 5. All of this depends on the nature of the article to be marked by the device. The radius of curvature of the slot 6 is substantially the mean radius of an automobile tire, i. e., the average of the external and internal radii. By diminishing the curved slot 6 accordingly, the device may effectively be used for marking automobile tires as indicated in the introduction to this description.

The ends of the casing 1 are interiorly screwthreaded, as at 11, and in one end of the screwed and hollow head 12 having a central opening for a lead-in conductor 13.

Screwed in the opposite end of the casing is an end abutment 14 provided with a central stud or screw 15 on which is mounted a head 16 that engages the end of the casing 1 and the endmost type or blank in the slot 6. A wing nut 17 is mounted on the screw 15 to hold the head 16 in place so that it may cooperate with the end wall 8 of the slot 6 in holding the type and blanks assembled in the enlargement 5.

Clamped between the abutment 14 and the head 12 is an electric heating unit comprising a tubular insulator 18 with a terminal plate 19 sandwiched between the end of the insulator and the head 12. This terminal plate is provided with binding posts 20 for the wires 21 of the conductor 13.

Suitably wound about the insulator 18 is a heating element 22 and said insulator is apertured, as at 23, so that end convolutions of the wound element may extend into the insulator having connection with the binding posts 20.

The electrical heating unit is in proximity to the inner ends of the type so that said type will be heated to the extent of making a burned impression when the type are placed against a piece of wood or other material forming the side wall of a shipping box, crate or the like. The handle 4 will permit of pressure being brought to bear, if necessary and obviously this handle may be shaped so that both ends may be employed to produce a uniform pressure throughout the length of the marking instrumentality.

Our device, as herein shown and described, is suggestive of other structures, for instance a casing of greater length so as to provide a compartment between the head 16 and the abutment 14 for type not being used. Again, the casing 1 may be made comparatively flat so as to accommodate a comparatively flat electric heating element that may be of the bar or ribbon type. In all instances we prefer to make the heating unit detachable by clamping it within the casing and removing it endwise therefrom. The same is true regarding the type and since the insulation material is commonly used in connection with electrical devices, we intend to freely use the same wherever necessary to insure safety or conservation of heat.

One embodiment of our invention has been illustrated, but it is to be understood that the structural elements are susceptible to such variations and modifications as fall within the scope of the appended claims.

What we claim is:—

1. A marking instrumentality comprising a casing having a curved longitudinal slot in its outer wall adapted to receive type, said slot having a radius of curvature substantially equal to the mean radius of an automobile tire, whereby the device is adapted for marking such tires.

2. A marking instrumentality comprising in combination a casing, a hollow head fitted in one end of said casing, a flanged abutment in the other end of said casing, a heating element centrally held by said flanged abutment against said hollow head, a terminal plate sandwiched between said hollow head and heating element, connecting means on said terminal plate, a lead-in through said hollow head and connected to said terminal plate, said connecting means and lead-in being received in said hollow head.

In testimony whereof we affix our signatures.

ROY H. BRESSON.
ERNEST V. KNOBLOCK.